United States Patent
Diab et al.

(10) Patent No.: US 7,966,504 B2
(45) Date of Patent: Jun. 21, 2011

(54) SYSTEM AND METHOD FOR POWER MANAGEMENT IN A COMPUTING DEVICE FOR POWER OVER ETHERNET

(75) Inventors: Wael William Diab, San Francisco, CA (US); Hemal V. Shah, Trabuco Canyon, CA (US); Simon Assouad, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1019 days.

(21) Appl. No.: 11/773,619

(22) Filed: Jul. 5, 2007

(65) Prior Publication Data

US 2008/0256371 A1    Oct. 16, 2008

Related U.S. Application Data

(60) Provisional application No. 60/911,122, filed on Apr. 11, 2007.

(51) Int. Cl.
*G06F 1/32* (2006.01)
*G06F 1/26* (2006.01)
*G06F 1/18* (2006.01)
*G06F 13/10* (2006.01)

(52) U.S. Cl. ........ 713/320; 713/300; 713/310; 713/321; 713/322; 713/323; 713/324; 713/330; 713/340

(58) Field of Classification Search .................. 713/300, 713/310, 320–324, 330, 340
See application file for complete search history.

(56) References Cited

U.S. PATENT DOCUMENTS

| | | | |
|---|---|---|---|
| 6,446,213 B1 * | 9/2002 | Yamaki | 713/300 |
| 7,240,224 B1 * | 7/2007 | Biederman | 713/300 |
| 7,363,525 B2 | 4/2008 | Biederman et al. | |
| 7,454,641 B2 | 11/2008 | Connor et al. | |
| 7,603,570 B2 | 10/2009 | Schindler et al. | |
| 2003/0099076 A1 | 5/2003 | Elkayam et al. | |
| 2006/0126464 A1 * | 6/2006 | Tomoaki et al. | 369/47.11 |
| 2006/0280195 A1 | 12/2006 | Lopez et al. | |
| 2007/0041387 A1 | 2/2007 | Ghoshal et al. | |
| 2007/0079151 A1 | 4/2007 | Connor et al. | |
| 2007/0103836 A1 * | 5/2007 | Oh | 361/115 |
| 2007/0110360 A1 | 5/2007 | Stanford | |
| 2007/0124608 A1 * | 5/2007 | Knowlson et al. | 713/300 |
| 2007/0135086 A1 | 6/2007 | Stanford | |
| 2008/0005433 A1 | 1/2008 | Diab et al. | |
| 2008/0005599 A1 | 1/2008 | Theocharous et al. | |
| 2008/0005600 A1 | 1/2008 | Diab et al. | |
| 2008/0005601 A1 | 1/2008 | Diab | |
| 2008/0016263 A1 | 1/2008 | Diab et al. | |
| 2008/0175260 A1 | 7/2008 | Hussain et al. | |

* cited by examiner

*Primary Examiner* — Thomas Lee
*Assistant Examiner* — Fahmida Rahman
(74) *Attorney, Agent, or Firm* — Duane S. Kobayashi (57) ABSTRACT

A system and method for operating system power management in a computing device for power over Ethernet (PoE). Computing devices such as portable computers or embedded devices having an operating system (OS) can leverage power management features in an OS. Power management state information such as user parameters, computing device parameters, application parameters, IT parameters, network parameters, etc. can be used to generate power requests that are acted upon by power sourcing equipment.

14 Claims, 6 Drawing Sheets

SYSTEM AND METHOD FOR POWER MANAGEMENT IN A COMPUTING DEVICE FOR POWER OVER ETHERNET

This application claims priority to provisional application No. 60/911,122, filed Apr. 11, 2007, which is incorporated by reference herein, in its entirety, for all purposes.

BACKGROUND

1. Field of the Invention

The present invention relates generally to Power over Ethernet (PoE) and, more particularly, to a system and method for operating system power management in a computing device for PoE.

2. Introduction

The IEEE 802.3af and 802.3at PoE specifications provide a framework for delivery of power from power sourcing equipment (PSE) to a powered device (PD) over Ethernet cabling. Various types of PDs exist, including voice over IP (VoIP) phones, wireless LAN access points, Bluetooth access points, network cameras, computing devices, etc.

In the PoE process, a valid device detection is first performed. This detection process identifies whether or not it is connected to a valid device to ensure that power is not applied to non-PoE capable devices. After a valid PD is discovered, the PSE can optionally perform a power classification. The completion of this power classification process enables the PSE to manage the power that is delivered to the various PDs connected to the PSE.

Managing PDs is one of the tasks of the PSE. In general, a PSE is designed to provide stable output power to a PD. One example of such a PD is a computing device (e.g., laptop computer or other software controlled device), which can have varying power requirements depending on the operation of its internal components. These internal components need not be uniform and can vary greatly between devices depending on the manufacturer and component suppliers. Moreover, power usage can be highly dependent on the application(s) running on the computing device as well as devices attached to the computing devices.

In one operating state, the computing device can be in a relatively idle state or performing simple tasks such as word processing. In another operating state, the computing device can be performing a variety of simultaneous tasks such as video encoding, disc burning, game playing, and even powering other USB devices. As would be appreciated, transitions between the various operating states can be rapid and continual as the usage requirements of the computing device change in accordance with the directives of the user. What is needed therefore is a mechanism for managing the power delivered to such PDs based on various state information available for such devices.

SUMMARY

A system and/or method for operating system power management in a computing device for PoE, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
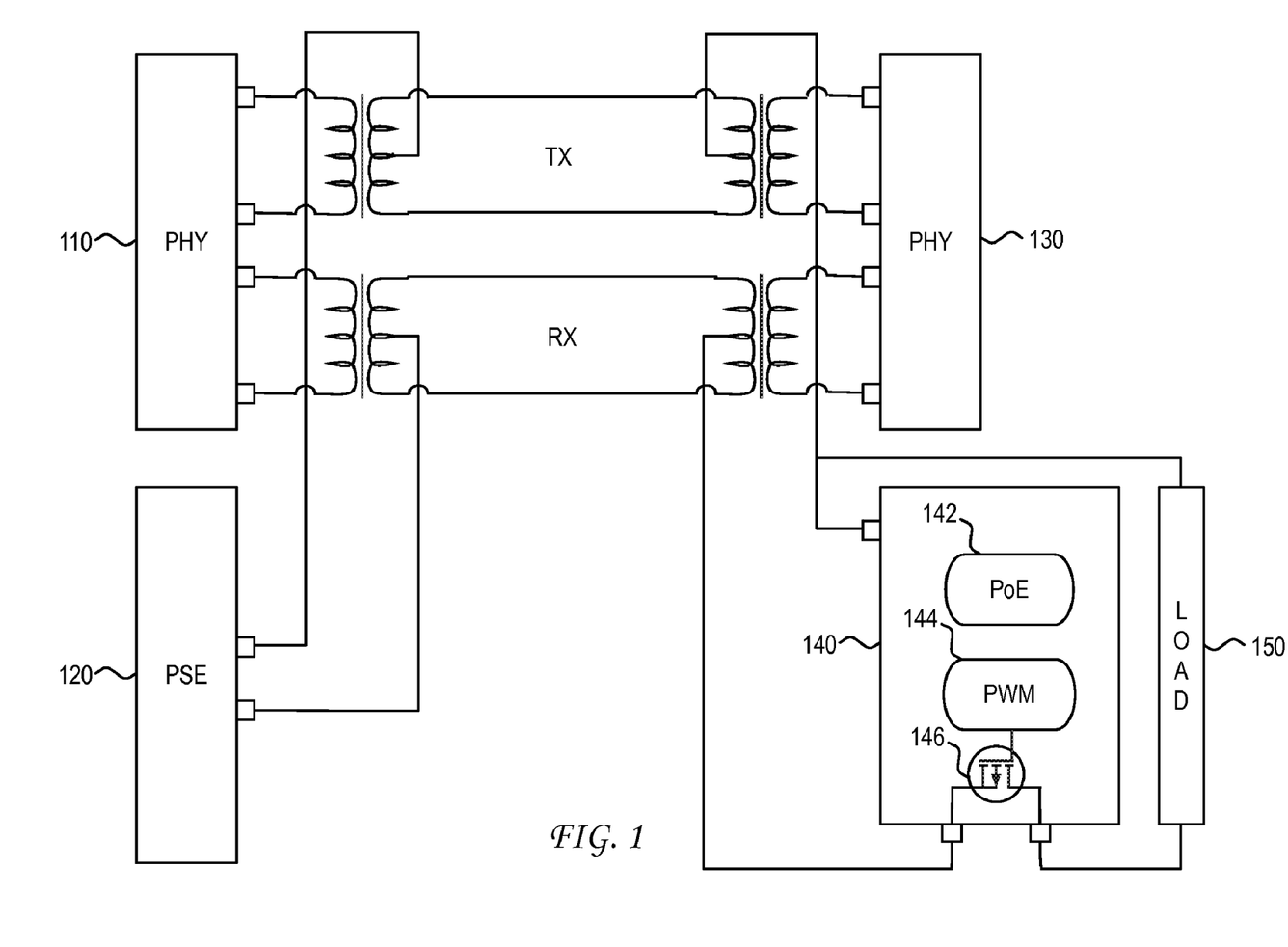
FIG. 1 illustrates an embodiment of a PoE system.

FIG. 1 illustrates an embodiment of a power over Ethernet (PoE) system. As illustrated, the PoE system includes power sourcing equipment (PSE) 120 that transmits power to powered device (PD) 140. Power delivered by the PSE to the PD is provided through the application of a voltage across the center taps of transformers that are coupled to a transmit (TX) pair and a receive (RX) pair of wires carried within an Ethernet cable. In general, the TX/RX pair can be found in, but not limited to structured cabling. The two TX and RX pairs enable data communication between Ethernet PHYs 110 and 130 in accordance with 10BASE-T, 100BASE-TX, 1000BASE-T, 10GBASE-T and/or any other layer 2 PHY technology.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3at, legacy PoE transmission, or any other type of PoE transmission. PD 140 also includes pulse width modulation (PWM) DC:DC controller 144 that controls power FET 146, which in turn provides constant power to load 150.

In the example of the IEEE 802.3af standard, PSE 120 can deliver up to 15.4 W of power to a plurality of PDs (only one PD is shown in FIG. 1 for simplicity). In the IEEE 802.at specification, on the other hand, a PSE can deliver up to 30 W of power to a PD over 2-pairs or 60 W of power to a PD over 4-pairs. Other proprietary solutions can potentially deliver even higher levels of power to a PD. In general, high power solutions are often limited by the limitations of the cabling.

As noted, one of the responsibilities of PSE 120 is to manage the power that is supplied to PD 140. One example of a PD is a computing device, such as a laptop computer or other software controlled device such as embedded devices having an operating system (OS). This computing device can have highly varying power requirements depending on the existence and state of operation of various internal or externally supported components. As noted, power usage can be highly dependent on the component(s) running on the computing device. In one operating state, the computing device can be in relatively idle state or performing simple tasks. In another operating state, the computing device can be performing a variety of simultaneous tasks such as video encoding, disc burning, game playing, and even powering other USB devices. In another operating state, the CPU(s) and system memory will be offline and the operating system/host software will not be running. In this OS-absent state, only a few components like a LAN device (possibly integrated with a management controller) will be running offline applications like management. In general, transitions between operating states such as those exemplified above, can be rapid and continual.

Computing devices that are connected to enterprise networks are typically connected on a non-permanent basis. Consider, for example, a corporate conference room that has multiple Ethernet ports for conference participants. In this conference room context, the switch box typically includes 5-20 ports for the entire conference room. In typical conference room usage scenarios, the limited PSE power supply would often be oversubscribed. This results since each computing device may require power to hold the battery level at a steady state under a typical usage scenario, and greater power for charging of the battery in the portable computing device. In combination, the PSE only has enough power to support a subset of the portable computing devices, each of which is attempting to extract as much power from the PSE as possible. Allocation of power to the various connected computing devices is therefore a key concern for the PoE system.

In a conventional 802.3af allocation, each PD would initially be assigned a 15.4 W power classification after a Layer 1 discovery process. An optional classification process could then reclassify the PD to a lower power level. For example, a Layer 2 classification engine can be used to reclassify the PD. In general, a Layer 2 classification process can be included in a PoE systems such as 802.3af, 802.3at or proprietary schemes. One of the disadvantages of this type of classification process is its inability to accurately model the PD's power demand.

Other limitations in the conventional power allocation process is the occurrence of a race condition between the computing devices in gaining access to needed power from the PSE. To avoid this race condition, a dynamic allocation process can be used. In this dynamic allocation process, Layer 2 packets (e.g., LLDP) can be used to facilitate requests and grants between the various PDs and the PSE.

In one solution, the switch can be configured to interrogate the computing device and ask for parameters such as battery capacity, battery life, etc. The switch can then make a priority decision based on a priority and allocation algorithm to determine whether to grant or deny the entire request or grant a lower power level. A disadvantage of this switch-centric model is the difficulties in upgrading the switches. In another solution, the computing device can be programmed (e.g., by the IT department) to submit a request for X power at priority Y. This programming can consider various power parameters of the portable computing device along with other factors such as the priority level of the user (e.g., management, engineer, etc.). A disadvantage of this solution is the complexity of defining a corporate policy for the various computing devices and users.

In accordance with the present invention, a priority and allocation determination scheme for PoE is enabled by leveraging existing power management mechanisms within the computing device. Prior to describing this features in detail, a description of an example computing device is first provided with reference to FIG. 2.

Figure 2:
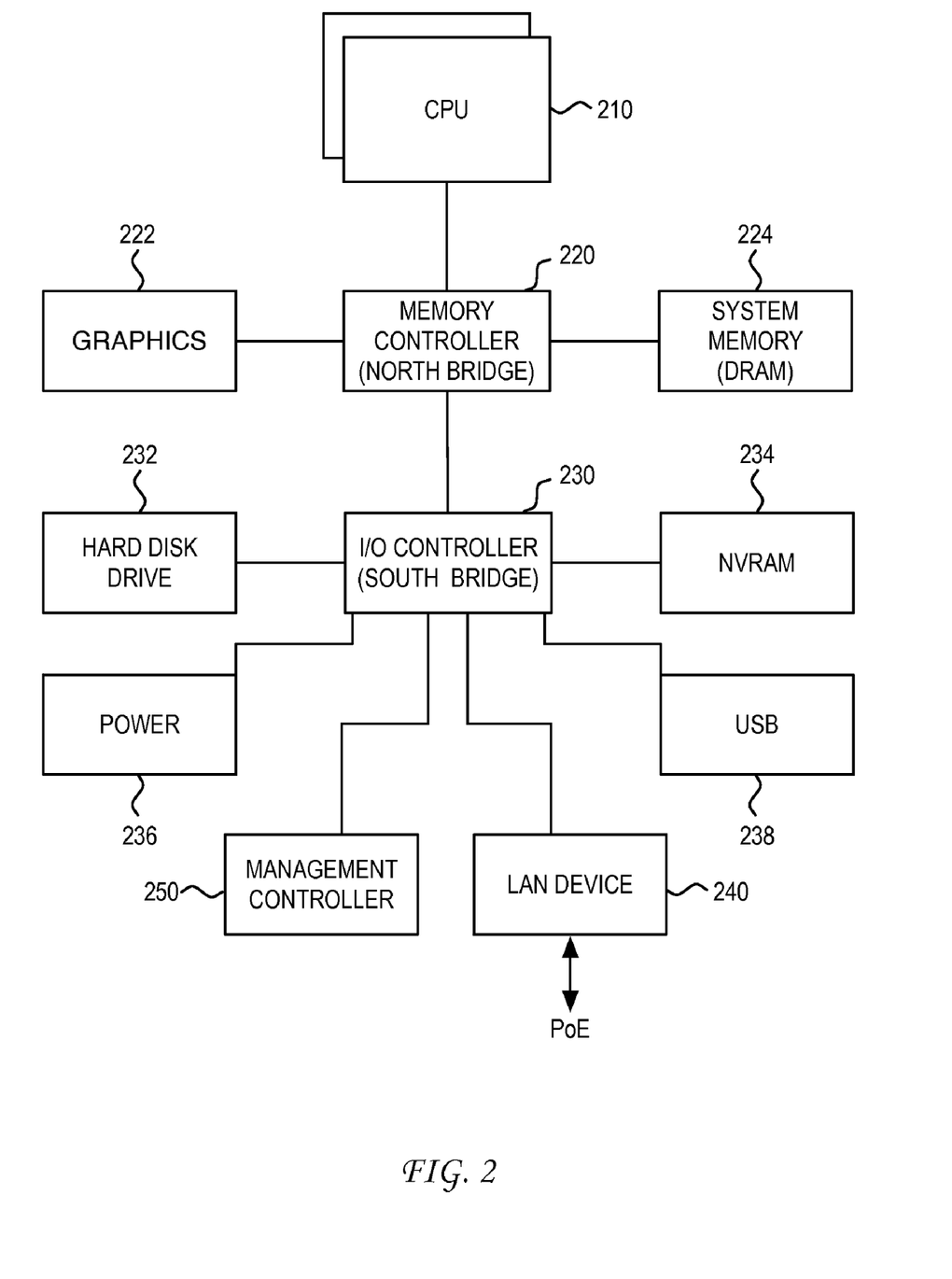
FIG. 2 illustrates an embodiment of a computing device.

In the illustration of FIG. 2, the computing device includes conventional computing components such as CPU(s) 210, memory controller (north bridge) 220, and I/O controller (south bridge) 230. As illustrated, memory controller 220 can be coupled to graphics subsystem 222 and main system memory 224. I/O controller 230, on the other hand, can also be coupled to various components, including hard disk drive 232, nonvolatile RAM (NVRAM) 234, power subsystem 236 and USB controller 238. As would be appreciated, the example embodiment of FIG. 2 is not intended to be exhaustive or limiting. Various other memory controller and I/O controller configurations can be used with the principles of the present invention.

As FIG. 2 further illustrates, I/O controller 230 is also in communication with LAN device 240. In general, LAN device 240 provides networking functionality onto the motherboard, thereby eliminating the need for an add-in network interface card (NIC). In one embodiment, LAN device 240 includes a fully integrated 10/100/1000BASE-T Gigabit Ethernet media access controller (MAC), PCI Express bus interface, on-chip buffer memory, and integrated physical layer (PHY) transceiver in a single-chip solution. In other embodiments, LAN device 240 can also include a wireless communication component.

In one embodiment, LAN device 240 is used to communicate requests (e.g., Layer 2 packets) that are generated by the OS (e.g., Windows XP, Vista, Mac OS X, etc.) based on existing power management information that is available to the OS. LAN device 240 (possibly with an integrated management controller) can also be used in an OS-absent environment (with CPU(s), chipset, and system memory powered down) to communicate requests to run offline applications. In various embodiments, the management controller is a discrete device such as that illustrated in FIG. 2, or can be integrated with memory controller 220, I/O controller 230, LAN device 240, etc. As would be appreciated, the particular method of communicating request to the PoE system would be implementation dependent. The power management information that is available to the OS enables a truly dynamic power allocation PoE scheme as it does not rely on semi-static information. In one embodiment, the OS would map power management information (e.g., power states) to a power request/priority. In another embodiment, the OS would pass on power management information to LAN device 240 for mapping to a power request/priority. In general, information can be communicated to LAN device 240 via an API to the OS, or some other low-level driver. In the OS-absent state, LAN device 240 can generate power request/priority to run offline applications. In this case, LAN device 240 would have enough intelligence about the power state of the system to generate the power request.

One type of power management information that can be used is CPU power management information, which includes processor power states called C states. In one example, C states C0-C3 are defined, with C0 being defined as "running." These C states offer progressively greater power savings while the CPU is idle. For example, when idle, state C1 can be entered, with transitions to deeper states C2 and C3 occurring if the system is uninterrupted.

A second type of power management information that can be used is CPU performance states P1-Pn. In one example, these performance states represent combinations of supply voltage and frequency for the processor.

A third type of power management information is device states. In one example, device state D0 represents a device (e.g., hard drive, DVD drive, USB device, etc.) being fully on, device state D1 and D2 represent intermediate power states, and device state D3 represents a device being powered off and unresponsive to its bus. As would be appreciated, these devices may be internal or external devices. In one example, an identity (e.g., type, ID) of a device such as a wall charger can also be used as part of the power allocation scheme. For example, a charger with minimal capacity can be augmented with a PoE request for power level Y, whereas a charger with greater capacity can lead to a lower priority PoE request for power level Z.

A fourth type of power management information relates to the operation of the system (e.g., S states). For example, state S1 can represent the situation where the CPU stops executing instructions and power to the CPU and RAM is maintained; state S2 can represent the situation where the CPU is powered off; state S3 can represent a sleep state where main memory is still powered, thereby enabling the user to resume work exactly where he/she left off; and state S4 can represent the situation where the system hibernates or suspends to disk by copying the contents of memory to a hard drive. As would be appreciated other forms of power management information could be used that is particular to the implementation of the computing device.

A fifth type of power management information relates to user defined power states. For example, a user can specify that a computing device operate in a presentation mode, high-battery mode, high-performance mode, etc. These various modes can broadly specify the needs of the computing device and can be changed at the discretion of the user.

A sixth type of power management information relates to a management controller that is running in an OS-absent environment. For example, in the OS-absent state, the management controller can have its own power states: powered on (fully functional mode for offline applications), low power mode (offline applications running at low power level), and wake mode (no offline applications running, the management controller is in wake up mode waiting for the network events).

These and other parameters can be used in generating a more refined power request and priority that more accurately reflect the power demands of the computing device. Moreover, the request frequencies and timing can be optimized. In one embodiment, the OS can also react to switch responses that do not grant its preferred request. For example, the OS can determine whether to turn things off, put devices in different states, etc.

It is a feature of the present invention that the PoE system leverages OS power management features in the computing device. Significantly, the power management information can be directly related to the tasks being performed, the devices that are being powered, as well as the general operating state of the computing device. In accordance with the present invention, various power management information (e.g., system power states, hysteresis, user defined power states, internal device states, external device states, external device activity, application load information, etc.) can be mapped to specific computing device power states, which can be communicated to the switch as part of a PoE request. This mapping provides a level of dynamic allocation since it considers the operating state of the system and any attached devices. As this mapping generates a more accurate picture of current power draw, this mapping goes far beyond semi-static measures such as battery life.

Figure 3:
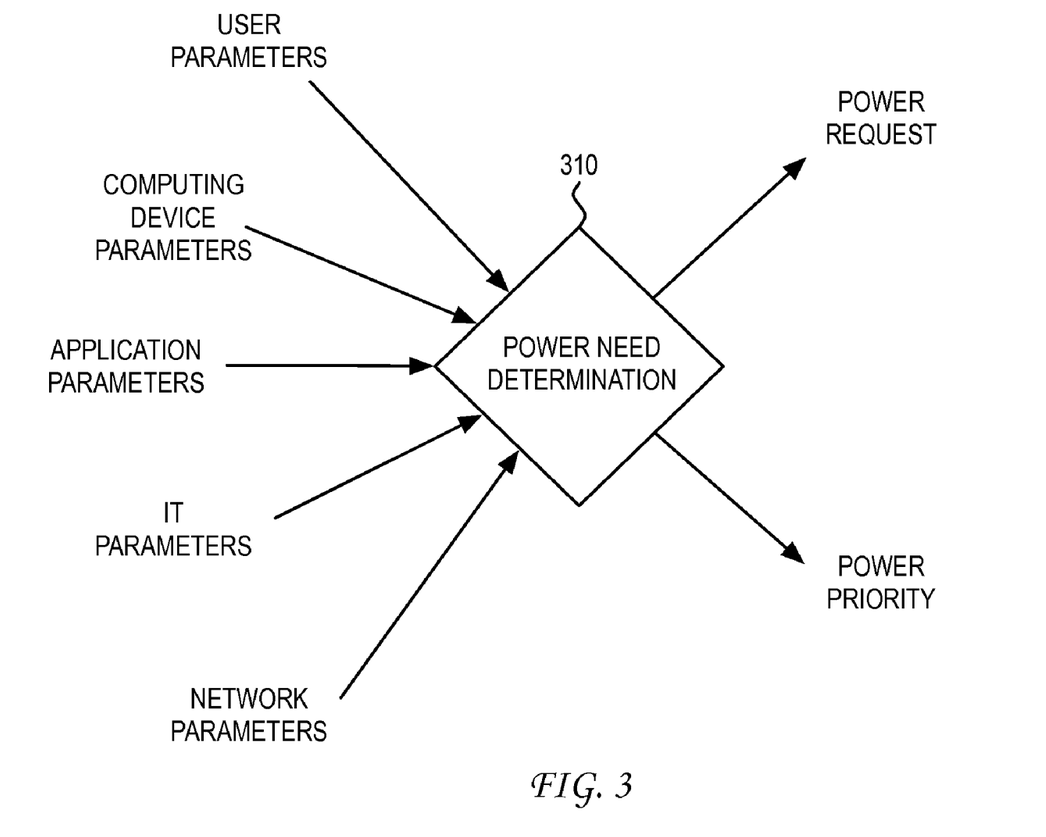
FIG. 3 illustrates an example mechanism of generating a power request and priority.

FIG. 3 illustrates an example mechanism of generating a power request and priority. As illustrated, various power management information can be used as inputs to power need determination 310. In this example, the power management information includes user parameters (e.g., management, engineering, admin, etc.); computing device parameters (e.g., battery capacity, battery life, system states, processor states, device states, etc.); application parameters (e.g., mode of operation, application load, etc.); IT parameters (e.g., computing device model, IT policies, performance characteristic data, etc.); and network parameters (e.g., length of cable, type of cable, etc.). As would be appreciated, the principles of the present invention would not be dependent on the particular set of power management information that is used as input. With this input set of power management information, power need determination 310 can then produce a power request and power priority for the computing device.

In this dynamic power need determination process, efficiency in tracking a request and priority to power needs is improved. As part of this efficiency, information about system load, application load, and peripherals can be used in predictive models regarding battery life. Results from this predictive model can then be linked back to the power management information to generate better power requests/grants. For example, if the computing device desires to maintain a certain power level, then it can request power level X.

Figure 4:
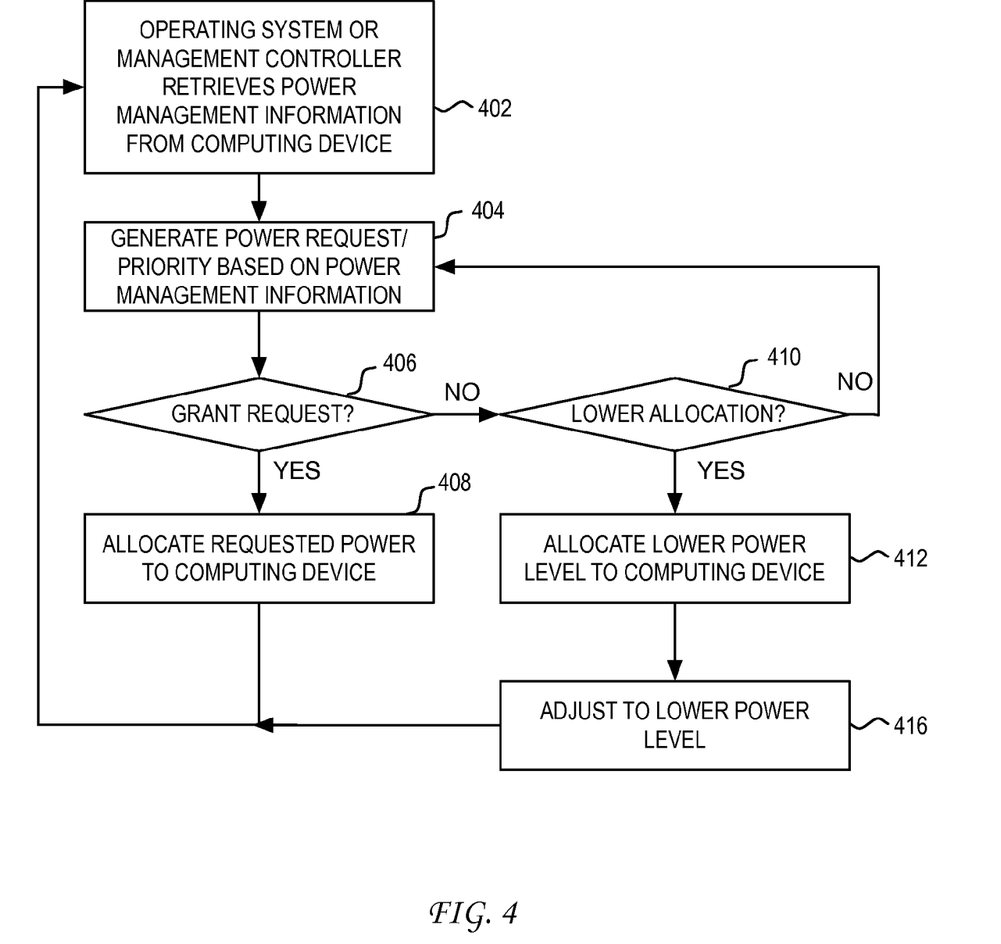
FIG. 4 illustrates a flowchart of a dynamic PoE allocation scheme.

FIG. 4 illustrates a flowchart of a dynamic PoE allocation scheme. As illustrated, the process begins at step 402 where the OS or management controller retrieves power management information from the computing device. As noted above, this power management information can include various information such as that illustrated in FIG. 3, including system power states, hysteresis, user defined power states, internal device states, external device states, external device activity, application load information, etc.

In general, the retrieval of power management information by the OS or management controller enables control at the highest level of the computing device. This results since the OS or management controller is aware of the operation of all hardware and software components in the computing device. As such, the OS or management controller is uniquely positioned to gain a comprehensive understanding of the past, present and projected power needs of the computing device.

One of the features of the present invention, is that the OS or management controller can leverage existing power management information. At step 404, the power management information is used to generate a power request and priority. In one embodiment, the generation of the power request and priority is performed by the OS or management controller as it manages the various hardware and software components in the computing device. In other embodiments, the LAN device or even the switch can be configured to process the raw power management information that is retrieved by the OS.

Regardless of the location of processing of the power management information, a dynamic allocation scheme results since the mapping goes far beyond semi-static measures such as battery life. After the power request and priority is generated, the switch can then determine whether to grant the request of the computing device at step 406. If the switch grants the request at step 406, then the requested power is allocated to the computing device at step 408. The process then continues back to step 402, where the OS or management controller continues to monitor the various states of the components within the computing device.

If, at step 406, the switch does not grant the request, then the switch can determine, at step 410, whether a lower power allocation is possible for the computing device. If it is determined that a lower power allocation is not possible, then the computing device would be alerted. A new power request and priority would then be generated at a later time. This new power request and priority can be based on existing power management information or newly retrieved power management information.

If, on the other hand, it is determined at step 410 that a lower power allocation is possible, then the switch would allocate a lower power level to the computing device at step 412. Once the computing device is alerted to the lower power level, the computing device can the adjust to the lower power level at step 416. In one embodiment, the computing device would notify the user and adjust application load, component states, etc. to accommodate the lower allocated power level. In one example, the computing device can power down a non-critical devices until a new power allocation is provided by the switch. In general, after the switch has allocated power to the computing device, the computing device can operate at that allocated power level until new power management information is retrieved that leads to an issuance of a new power request and priority.

It is a feature of the present invention that this monitoring process is continual as the OS or management controller monitors the changes in operating states of the computing device. As would be appreciated, these changes in operating states can radically change the power needs of the computing device. For example, if a USB port on the computing device is used to charge a mobile phone and a disc is being burned by the internal drive, then a significant increase in power requirements would occur. Semi-static measures such as battery life cannot accurately model the changes in power needs in real time.

Figure 5:
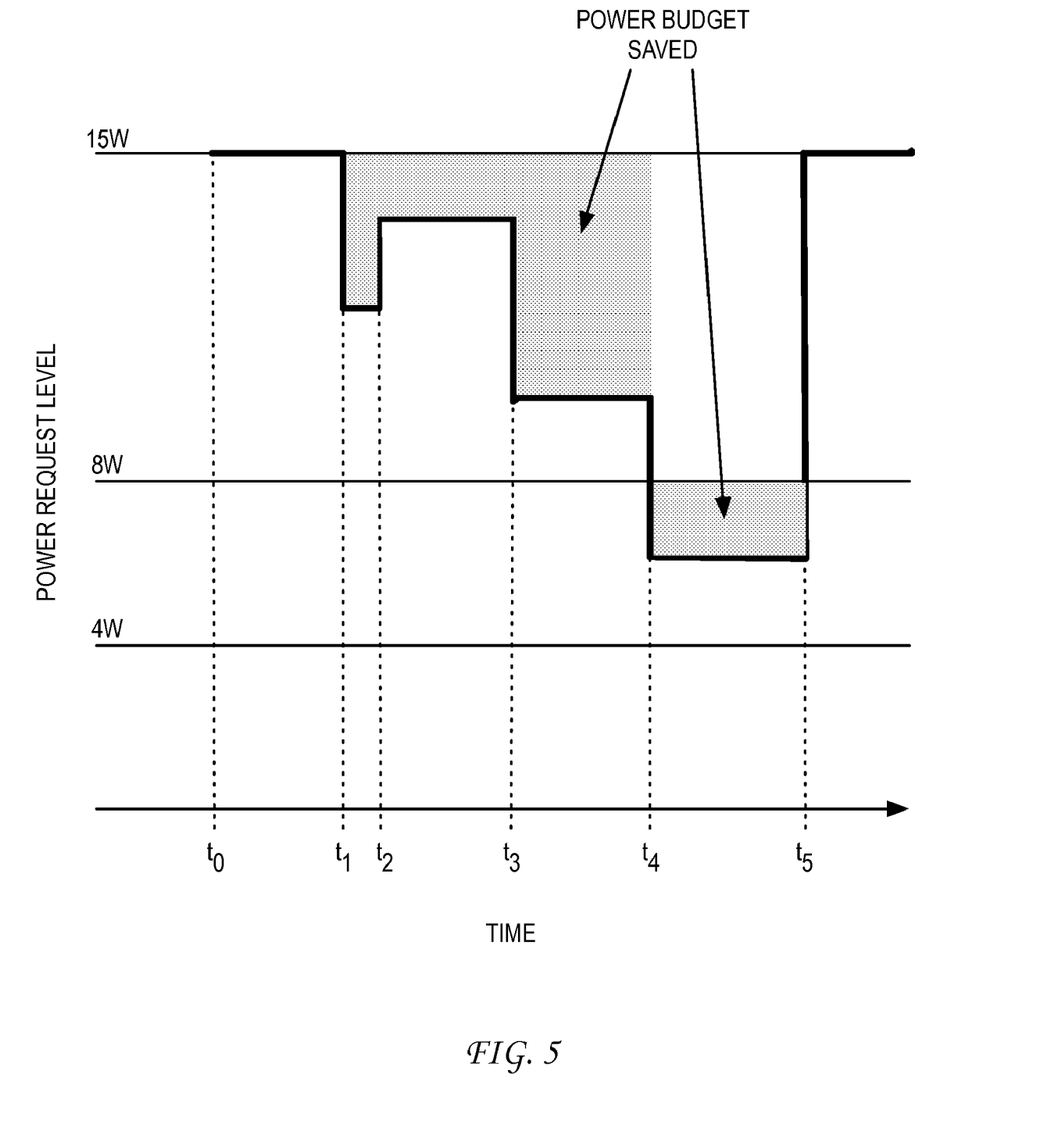
FIG. 5 illustrates an example of a dynamic PoE allocation for a computing device.

FIG. 5 illustrates an example of a dynamic PoE allocation for a computing device, wherein power requests for the computing device are generated in correlation with the changing needs of the computing device. As illustrated, these various requests at times $t_0$-$t_5$ can be generated sporadically and at discrete power levels that correlate closely to actual power needs of the computing device. For example, after starting at full power at time to, a power request can be generated at time $t_1$ to reduce the power level to 12 W. At time $t_2$, a new power request can be generated to reduce the power level to 13.5 W, and so on. As this example illustrates discrete power levels can be chosen that correlate to actual or projected power demand of the computing device.

As these power levels are based on a comprehensive view of the operation of the computing device, they need not be restricted to fixed allocations such as 15 W, 8 W, and 4 W in 802.3af. In other words, real time power management using a whole environment view of the computing device enables the generation of power requests with greater granularity, which thereby improves the efficiency of power allocation to the various requesting systems. In the example of FIG. 5, the actual power budget that is saved or "optimized" is the area above the curve up to the next discrete power level. For example, between the time $t_1$ and $t_2$, the allocated power level of 12 W would save 3 W in the power budget for that period of time since the allocated power level would have been budgeted at 15 W. As this example illustrates, the leveraging of the intelligence that is accessible by the OS enables the generation of requests that go far beyond conventional fixed power allocations.

In one embodiment, a user can also specify how accurately power requests should track the power management analysis based on the computing device environment information. Here, a specification of high accuracy would yield highly granular requests that track any changes in the operating state of the computing device. In contrast, a specification of lower accuracy would yield less granular requests that may track only large changes in the operating state of the computing device. In one embodiment, the level of granularity can be implemented as a slide bar control in a power management user interface. At one extreme, the OS would have no OS involvement and a semi-static scheme would be used. At another extreme, the OS would be trying to forward look and predict power demand by the computing device. In the middle, OS can look at the current state and incorporate all power usage and supply information that is available.

Figure 6:
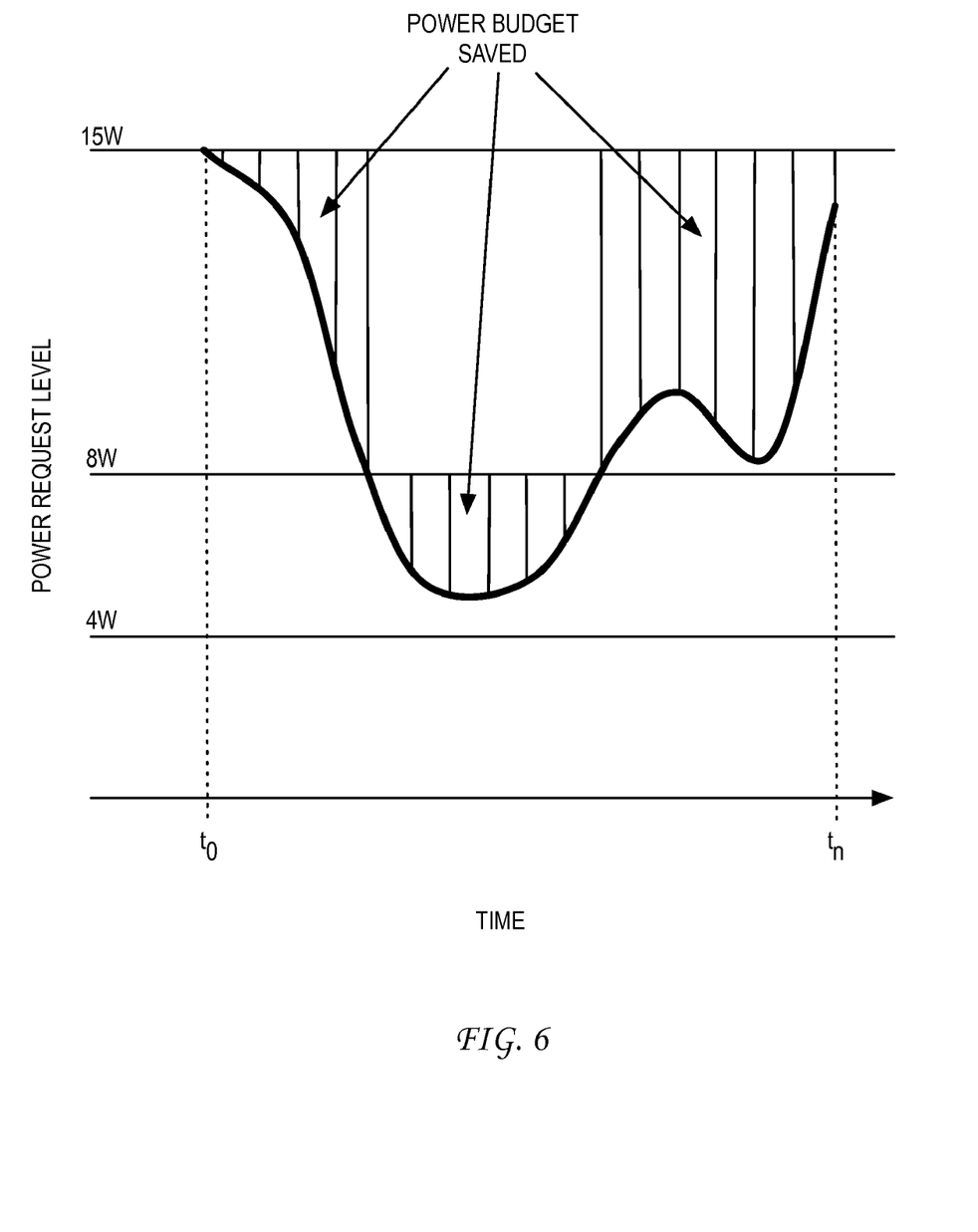
FIG. 6 illustrates an example of a dynamic PoE allocation for a computing device using highly granular requests.

FIG. 6 illustrates an example of a dynamic PoE allocation for a computing device using highly granular requests. In this example, the allocated power level can be represented with a much smoother curve as compared to the discrete changes shown in FIG. 5. Here, the smooth curve represents a situation where the OS or management controller is constantly reacting to the changed power management environment in submitting requests to the switch. As the OS or management controller is requesting only as much power as it needs, the power budget savings would be maximized as is illustrated.

As has been described, PoE requests can be based on computing device environment information. As noted above, the PoE request can also be based on user specific information, IT department specific information, and network information. For example, user specific information can relate to an employee level such as management, engineering, administrative, etc., IT department specific information can relate to the level of treatment of particular computing device models, and network information can relate to the type and length of the network connection.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A power over Ethernet method, comprising:
    retrieving, by an operating system, power management information for a computing device, said power management information including hardware device parameters that identify an operating state of one or more hardware components in said computing device and software parameters that identify an application load of one or more software applications running on said computing device;
    generating a power request based on said power management information, said generating also being responsive to a specified level of accuracy that determines how close said power request matches a power management analysis based on said power management information; and
    allocating power, by a power sourcing equipment, to said computing device based on said power request.

2. The method of claim 1, wherein said computing device is a portable computer.

3. The method of claim 1, wherein said computing device is a device having an embedded operating system.

4. The method of claim 1, wherein said retrieving comprising retrieving a processor power state.

5. The method of claim 1, wherein said retrieving comprising retrieving a CPU performance state.

6. The method of claim 1, wherein said retrieving comprising retrieving a device state.

7. The method of claim 6, wherein said retrieving comprising retrieving an internal device state.

8. The method of claim 6, wherein said retrieving comprising retrieving an external device state.

9. The method of claim 1, wherein said retrieving comprising retrieving system operation state.

10. The method of claim 1, wherein said generating comprises generating by said operating system.

11. The method of claim 10, further comprising sending said power request to a switch via a Layer 2 packet.

12. The method of claim 11, wherein said sending comprising sending via a LAN device.

13. The method of claim 1, wherein said generating comprises generating by a LAN device.

14. The method of claim 1, wherein said generating comprises generating by a switch.

* * * * *